United States Patent Office 3,403,581
Patented Oct. 1, 1968

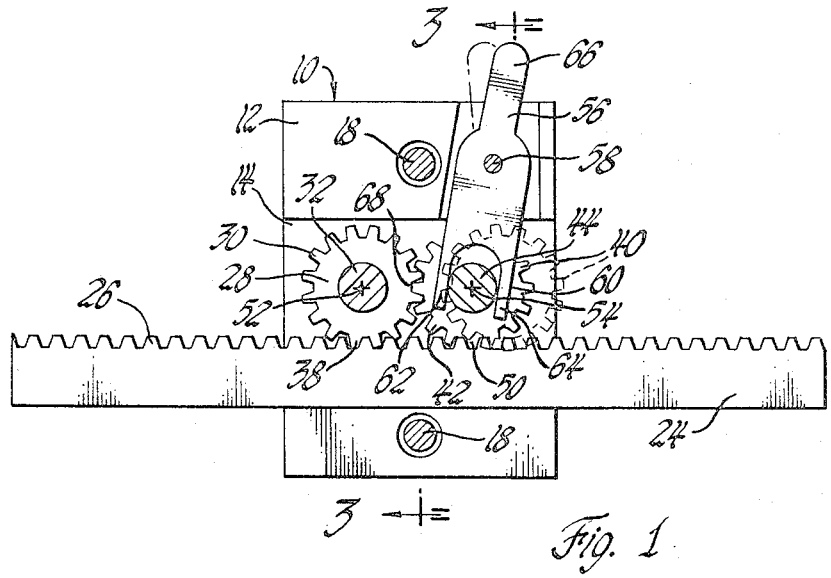

3,403,581
LATCH MECHANISM
Gerald A. Harness, Kettering, Ohio, assignor to General
Motors Corporation, Detroit, Mich., a corporation of
Delaware
Filed Oct. 21, 1966, Ser. No. 588,501
3 Claims. (Cl. 74—530)

ABSTRACT OF THE DISCLOSURE

A latching device in which a toothed rack is movable linearly and has two toothed rotatable gears in meshing engagement therewith. One of the gears is linearly movable toward and away from the other gear, along a line joining the axes of the gears and therefore into and out of meshing engagement with the other gear to release or lock the mechanism. Releasing movement of the linearly movable gear causes concurrent rotational movement of both gears in the unlocking direction so long as the two gears are meshed with each other.

---

The invention relates to a latching device and more particularly to one utilizing movable toothed engaging members which may be so positioned as to permit or prevent relative tooth movement and thereby release or lock the latch mechanism. In its preferred form, structure embodying the invention includes two rotatable gears and a third toothed member which may be a gear or rack, for example. The two rotatable gears mesh with mating teeth on the gear or rack so that any movement of the gear or rack results in rotatable movement of the two gears. One of the gears is mounted so as to be movable in translation and either mesh with or be disengaged from the other gear. When the two gears are disengaged, movement of the gear or rack will result in rotary movement of both gears in the same rotary direction. However, when the two gears are in mesh, a locked condition exists so that no relative movement of the gears and the gear or rack member may be obtained even though force may be exerted in an attempt to obtain such movement. The mechanism embodying the invention may be utilized in lock mechanisms such as that used on vehicle doors or for locking and unlocking a parking brake lever, by way of example.

In the drawing:

FIGURE 1 is an elevation view of a mechanism embodying the invention, with parts shown in section.

FIGURE 2 is a cross section view of a portion of the mechanism of FIGURE 1, taken in the direction of arrows 2—2 of FIGURE 3.

FIGURE 3 is a cross section view of the mechanism of FIGURE 1, taken in the direction of arrows 3—3 of that figure.

The latch assembly 10 has a housing 12 provided with a chamber or recess 14, which may be a through channel or slot. The chamber 14 is covered on one side by a cover plate 16 which is suitably fastened to the housing by bolts 18. A part of chamber 14 adjacent the cover plate 16 is defined by a shoulder 20 and a guide surface 22. In the particular embodiment shown, a first toothed movable member 24 is provided as a rack having teeth 26. The rack is received within the chamber 14 so that it is linearly movable, being guided by shoulder 20, guide surface 22, and a portion of the cover plate 16. The teeth 26 are positioned so that they extend into the main part of chamber 14. A second toothed movable member 28, which is a rotatable gear having external teeth 30, is provided with a shaft 32 extending through apertures 34 and 36 respectively formed in a side wall of housing 12 and a portion of cover plate 16 extending over chamber 14. The teeth 30 of the gear 28 are in meshed alignment with the teeth 26 of the rack 24. As seen in FIGURE 1, teeth 26 and 30 are meshed at 38. Apertures 34 and 36 may be provided with suitable bearings, or otherwise formed, so as to permit rotation of shaft 32 and therefore of gear 28, while preventing any translational movement thereof.

A third toothed movable member 40 is provided within the chamber 14 and is illustrated as being a gear having external teeth 42 and a shaft 44. Gear 40 may be similar to gear 28. The opposite ends of shaft 44 extend through elongated apertures 46 and 48 respectively formed in a sidewall of housing 12 and a part of cover plate 16 covering chamber 14. Apertures 46 and 48 extend parallel to the rack guide surface 22. They position gear 40 so that the gear teeth 42 mesh at 50 with the rack teeth 26. The axes 52 and 54 of shafts 32 and 44 are parallel. When shaft 44 is positioned in the ends of the elongated apertures 46 and 48 extending toward axis 52, teeth 30 of gear 28 and teeth 42 of gear 40 are in full mesh as shown in FIGURE 1. When shaft 44 is in the ends of elongated apertures 46 and 48 extending away from gear axis 52, teeth 30 and 42 are fully disengaged so that the gears may be relatively rotated. If toothed member 24 is a gear subjected to rotary movement instead of linear movement, apertures 46 and 48 are formed arcuately with the axis of that gear as the axis of their arcs, so that gear 40 will remain in mesh with member 24 as its shaft 44 is moved in the elongated apertures.

A lever 56 is pivotally mounted in the housing 12 on a pivot pin 58 and has a forked or slotted end 60 provided with tines 62 and 64 which extend over shaft 44 adjacent the gear 40 and the housing side wall. Lever 56 is provided with a handle 66 extending outwardly of the housing so that it may be pivotally moved. When the lever is in the position shown in solid lines in FIGURE 1, gear 40 is in mesh with rack 24 and gear 28. When the handle is moved to the position shown in dashed lines in FIGURE 1, gear 40 remains in mesh with rack 24, but does not mesh with gear 28.

When the mechanism is in the unlatched condition, rack 24 may be linearly moved leftwardly and rightwardly, as seen in FIGURE 1, and will cause gears 28 and 40 to rotate about their respective axes. Since the gears are not in fesh, they permit free linear movement of the rack. When it is desired to lock the rack, and the other toothed movable members as well, the lever 56 is moved so that gear 40 also meshes with gear 28. In this condition, even though forces are exerted on rack 24 to move it in a linear direction, this movement cannot be accomplished. Since attempted movement of the rack leftwardly, for example, would attempt to move both gears 28 and 40 clockwise, and since this is not possible with teeth 30 and 42 in mesh at mesh point 68, all three toothed movable members are locked. With gear 40 unmeshed from gear 28, both gears 28 and 40 may move in the same rotatable direction when rack 24 is linearly moved. In some installations gear 28 may be the driving member which is to be locked and unlocked. However, the mechanism will function in the same manner.

I claim:
1. A latch mechanism comprising:
   a first toothed movable member,
   a second toothed movable member meshing with said first member in driving relation,
   a third toothed member meshing with said first member in driving relation and movable rotationally and translationally,
   said second and third members being rotatably movable gears,
   and means guiding and selectively moving said third member into mesh with said second member to lock said members against driving movement and selectively moving said third member out of mesh with said second member to permit driving movement of said members, said third member guiding and selectively moving means restricting translatory movement of said third member to a line connecting the rotating axes of said second and third members, said translatory movement of said third member out of mesh with said second member causing limited concurrent rotational movement of said second and third members in an unlocking direction so long as said second and third members are enmeshed during such translatory movement.

2. The latch mechanism of claim 1, said first member being a linearly movable toothed rack, and means restricting movement of said first member along a line parallel to a plane connecting the rotating axes of said second and third members.

3. The latch mechanism of claim 1, said third member guide and selectively moving means restricting translatory movement of said third member so that the axis of rotation of said third member remains at the same distance from the nearest point thereto of said first member.

References Cited
UNITED STATES PATENTS 2,672,061   3/1954   Gardner _____ 74—530

FRED C. MATTERN, JR., *Primary Examiner.*

B. T. CALLAHAN, *Assistant Examiner.*